(12) United States Patent
Skerry et al.

(10) Patent No.: US 11,797,076 B2
(45) Date of Patent: *Oct. 24, 2023

(54) USING NETWORK INTERFACE CONTROLLER (NIC) QUEUE DEPTH FOR POWER STATE MANAGEMENT

(71) Applicant: Intel Corporation, Santa Clara, CA (US)

(72) Inventors: Brian J. Skerry, Gilbert, AZ (US); Ira Weiny, Livermore, CA (US); Patrick Connor, Beaverton, OR (US); Tsung-Yuan C. Tai, Portland, OR (US); Alexander W. Min, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/364,523

(22) Filed: Jun. 30, 2021

(65) Prior Publication Data

US 2021/0405730 A1     Dec. 30, 2021

Related U.S. Application Data

(63) Continuation of application No. 15/375,756, filed on Dec. 12, 2016, now Pat. No. 11,054,884.

(51) Int. Cl.
*G06F 1/3234*     (2019.01)
*G06F 1/3209*     (2019.01)
*H04L 49/00*      (2022.01)
*H04L 49/40*      (2022.01)

(52) U.S. Cl.
CPC .......... *G06F 1/3243* (2013.01); *G06F 1/3209* (2013.01); *H04L 49/40* (2013.01); *H04L 49/70* (2013.01); *Y02D 10/00* (2018.01)

(58) Field of Classification Search
CPC ..... G06F 1/3243; G06F 1/3209; Y02D 10/00; H04L 49/40; H04L 49/70
See application file for complete search history.

(56) References Cited

U.S. PATENT DOCUMENTS

| | | |
|---|---|---|
| 7,636,307 B2 | 12/2009 | Thibodeau et al. |
| 7,636,308 B2 | 12/2009 | Kwon |
| 8,898,494 B2 | 11/2014 | Schluessler et al. |
| 8,984,309 B2 | 3/2015 | Memon et al. |
| 9,830,187 B1 | 11/2017 | Blaine et al. |
| 2004/0163000 A1 | 8/2004 | Kuhlmann et al. |
| 2006/0026447 A1 | 2/2006 | Naveh et al. |

(Continued)

OTHER PUBLICATIONS

Queue from Wikipedia, 2013, p. 1.*

(Continued)

*Primary Examiner* — Aurel Prifti
(74) *Attorney, Agent, or Firm* — Schwabe, Williamson & Wyatt, P.C.

(57) ABSTRACT

A computer-implemented method can include receiving a queue depth for a receive queue of a network interface controller (NIC), determining whether a power state of a central processing unit (CPU) core mapped to the receive queue should be adjusted based on the queue depth, and adjusting the power state of the CPU core responsive to a determination that the power state of the CPU core should be adjusted.

22 Claims, 5 Drawing Sheets

(56) References Cited

U.S. PATENT DOCUMENTS

| | | |
|---|---|---|
| 2007/0053374 A1* | 3/2007 | Levi ............... H04L 49/40 |
| | | 370/431 |
| 2007/0070904 A1 | 3/2007 | King et al. |
| 2009/0006521 A1 | 1/2009 | Veal et al. |
| 2009/0089470 A1 | 4/2009 | Ven |
| 2009/0193168 A1* | 7/2009 | Chang ............ G06F 13/385 |
| | | 710/260 |
| 2009/0199020 A1 | 8/2009 | Bose et al. |
| 2009/0259861 A1 | 10/2009 | Tune |
| 2010/0005479 A1 | 1/2010 | Avasthi et al. |
| 2010/0067416 A1 | 3/2010 | Gao et al. |
| 2010/0281190 A1 | 11/2010 | Namihira |
| 2011/0022871 A1 | 1/2011 | Bouvier et al. |
| 2011/0072295 A1 | 3/2011 | Shahidi et al. |
| 2011/0093733 A1 | 4/2011 | Kruglick |
| 2011/0113270 A1 | 5/2011 | Carter et al. |
| 2011/0142064 A1* | 6/2011 | Dubai ............. H04L 47/122 |
| | | 370/412 |
| 2013/0060555 A1 | 3/2013 | Thomson et al. |
| 2013/0111242 A1 | 5/2013 | Heller et al. |
| 2013/0179612 A1 | 7/2013 | Feekes |
| 2013/0311797 A1 | 11/2013 | Ahmad et al. |
| 2013/0326250 A1 | 12/2013 | Sullivan et al. |
| 2013/0346772 A1 | 12/2013 | Abou Gazala et al. |
| 2014/0095801 A1 | 4/2014 | Bodas et al. |
| 2014/0095902 A1 | 4/2014 | Rorai et al. |
| 2014/0108676 A1 | 4/2014 | Fan |
| 2014/0181818 A1 | 6/2014 | Vincent et al. |
| 2014/0189387 A1* | 7/2014 | Vilhauer ......... G06F 1/3293 |
| | | 713/320 |
| 2014/0219287 A1 | 8/2014 | Birke et al. |
| 2014/0258759 A1* | 9/2014 | Mital ............. G06F 9/4893 |
| | | 713/324 |
| 2015/0106595 A1* | 4/2015 | Khot ............. G06F 9/3855 |
| | | 712/215 |
| 2015/0198991 A1* | 7/2015 | Bircher ............. G06F 1/329 |
| | | 713/323 |
| 2015/0198992 A1* | 7/2015 | Kumar ............ G06F 9/5094 |
| | | 713/320 |
| 2015/0253837 A1* | 9/2015 | Sukonik .......... G06F 1/3287 |
| | | 713/320 |
| 2015/0261583 A1 | 9/2015 | Vanka et al. |
| 2015/0263974 A1 | 9/2015 | Jain et al. |
| 2015/0309551 A1 | 10/2015 | Yeager |
| 2015/0331815 A1 | 11/2015 | Dai et al. |
| 2015/0331818 A1 | 11/2015 | Klein et al. |
| 2015/0355949 A1 | 12/2015 | Bass et al. |
| 2016/0062442 A1 | 3/2016 | Burstein et al. |
| 2016/0062447 A1 | 3/2016 | Hsu et al. |
| 2016/0070585 A1 | 3/2016 | Tsirkin |
| 2016/0077565 A1* | 3/2016 | Jayaseelan .......... G06F 9/544 |
| | | 713/340 |
| 2016/0127276 A1 | 5/2016 | Wu et al. |
| 2016/0293174 A1* | 10/2016 | Atti ................. G10L 19/26 |
| 2016/0306416 A1* | 10/2016 | Browne ........... G06F 1/3296 |
| 2016/0321183 A1* | 11/2016 | Govindan ......... G06F 1/3296 |
| 2016/0342198 A1 | 11/2016 | Hsu et al. |
| 2016/0371090 A1* | 12/2016 | Brownscheidle ..... G06F 9/3855 |
| 2017/0023996 A1 | 1/2017 | Lou et al. |
| 2017/0055031 A1 | 2/2017 | Park et al. |
| 2017/0061568 A1* | 3/2017 | Metz .................. G06T 1/20 |
| 2017/0109172 A1* | 4/2017 | Sleiman ......... G06F 9/30098 |
| 2017/0180261 A1 | 6/2017 | Ma et al. |
| 2017/0295113 A1 | 10/2017 | Francini et al. |
| 2017/0364132 A1* | 12/2017 | Gendler ............ G06F 1/3243 |

OTHER PUBLICATIONS

International search report for PCT application No. PCT/US2017/062694, dated Mar. 19, 2018 (3 pages).

Written opinion for PCT application No. PCT/US2017/062694, dated Mar. 19, 2018 (9 pages).

International Preliminary Report on Patentability from PCT /US2017 / 062694 dated Jun. 27, 2019, 11 pgs.

Non-Final Office Action dated Jun. 28, 2018 for U.S. Appl. No. 15/375,756, 9 pages.

Final Office Action dated Feb. 6, 2019 for U.S. Appl. No. 15/375,756, 14 pages.

Non-Final Office Action dated Jun. 24, 2019 for U.S. Appl. No. 15/375,756, 36 pages.

Final Office Action dated Apr. 16, 2020 for U.S. Appl. No. 15/375,756, 44 pages.

Non-Final Office Action dated Oct. 5, 2020 for U.S. Appl. No. 15/375,756, 39 pages.

* cited by examiner

USING NETWORK INTERFACE CONTROLLER (NIC) QUEUE DEPTH FOR POWER STATE MANAGEMENT

RELATED APPLICATIONS

This application is a continuation of U.S. patent application Ser. No. 15/375,756, entitled "USING NETWORK INTERFACE CONTROLLER (NIC) QUEUE DEPTH FOR POWER STATE MANAGEMENT" filed on Dec. 12, 2016, and issued as U.S. Pat. No. 11,054,884 on Jul. 6, 2021, and claims priority to the Ser. No. 15/375,756 application. The entire contents of the Ser. No. 15/375,756 application is incorporated herein by reference.

TECHNICAL FIELD

The disclosed technology relates generally to network interface controllers (NICs), such as Ethernet controllers, virtual network functions (VNFs), power management, and software-defined networks.

BACKGROUND

FIG. 1 is a functional block diagram illustrating an example of a system 100 that includes a computing device 110, such as a network appliance. In the example, the computing device 110 includes a central processing unit (CPU) 112 for executing instructions as well as a memory 114 for storing such instructions. The CPU 112 has n CPU cores. As used herein, the term core generally refers to a basic computation unit of the CPU. The memory 114 may include random access memory (RAM), flash memory, hard disks, solid state disks, optical disks, or any suitable combination thereof.

The computing device 110 also includes a network interface controller (NIC) 116 for enabling the computing device 110 to communicate with at least one other computing device 120, such as an external or otherwise remote device, by way of a communication medium such as a wired or wireless packet network, for example. The computing device 110 may thus transmit data to and/or receive data from the other computing device(s) by way of its NIC 116. For example, the NIC 116 has n receive queues for receiving data, e.g., ingress packets, from the other computing device (s).

BRIEF DESCRIPTION OF THE DRAWINGS

The concepts described herein are illustrated by way of example and not by way of limitation in the accompanying figures. For simplicity and clarity of illustration, elements illustrated in the figures are not drawn to scale unless otherwise noted.

DETAILED DESCRIPTION OF THE DRAWINGS

Figure 1:
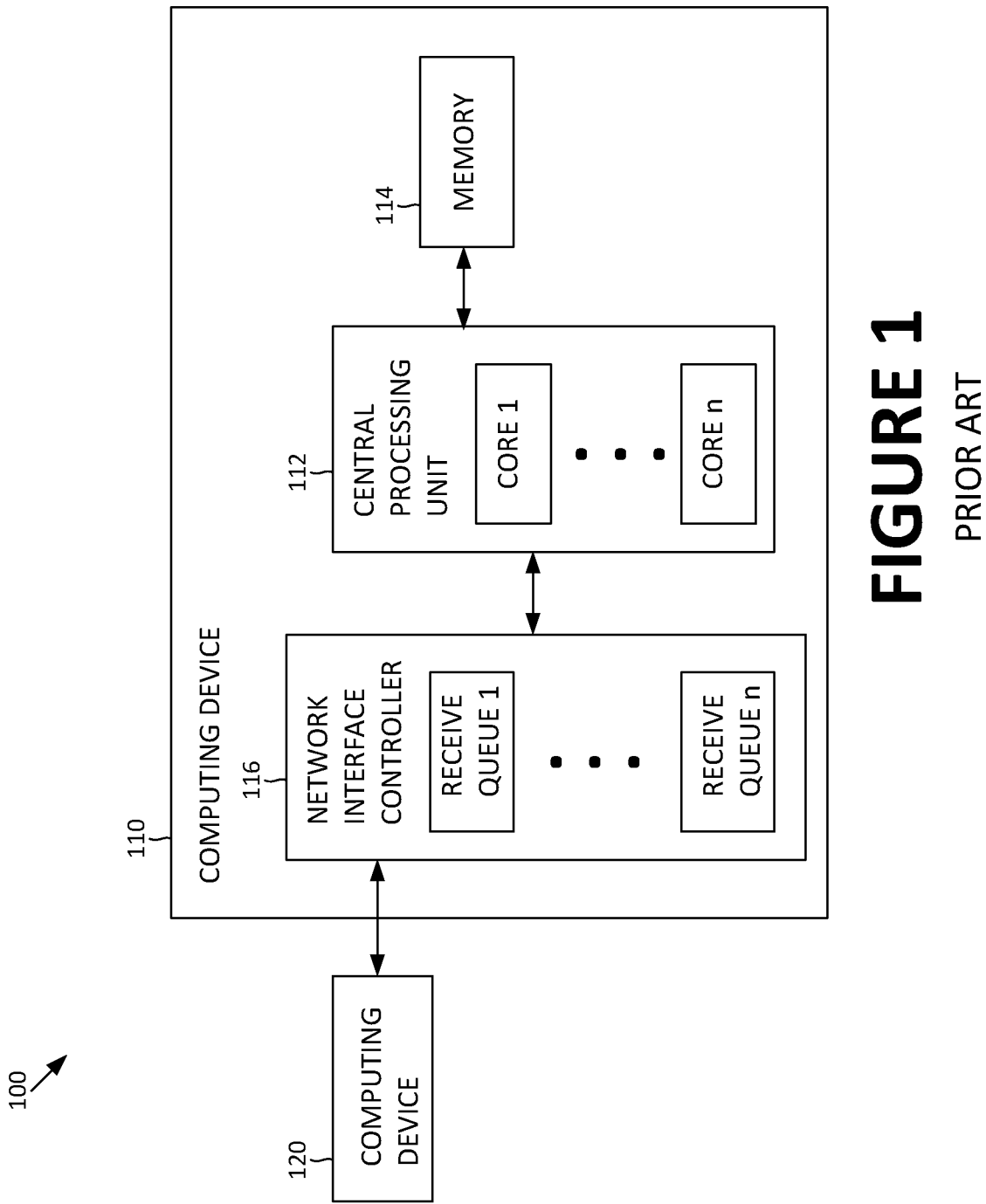
FIG. 1 is a functional block diagram illustrating an example of a system having a computing device that includes a central processing unit (CPU), a memory, and a network interface controller (NIC).

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, such feature, structure, or characteristic can be employed in connection with another disclosed embodiment whether or not such feature is explicitly described in conjunction with such other disclosed embodiment.

The disclosed embodiments may be implemented, in some cases, in hardware, firmware, software, or any combination thereof. The disclosed embodiments may also be implemented as instructions (e.g. a computer program product) carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Embodiments of the disclosed technology generally pertain to techniques and mechanisms for CPU core power management that allow for rapid changes to take place in dynamic network traffic environments. Such embodiments generally include an assessment of queue depth for a network appliance, e.g., virtual or physical appliance, and adjustment of the corresponding CPU core's power based on the assessment. For example, if a determination is made that the queue depth for a network appliance in a multi-core system is low, e.g., below a particular threshold, the corresponding CPU core(s) may be placed in a reduced-power state to conserve power while simultaneously maintaining the overall network performance.

Present power management techniques involve assessing a particular CPU core at a given point in time and adjusting the CPU core power state based on that assessment, but such assessment does not take into account how much demand will be put on the CPU core after that point in time. In contrast, the disclosed techniques that include assessing a receive queue depth include a significantly greater prediction of near-term needs for the CPU core. In situations where receive queue depth is low, expected performance from the CPU core is lessened such that the power state may be reduced without negatively impacting the performance. Alternatively, in situations where receive queue depth is high, the CPU core will likely not be able to keep up with the increased demand unless the power state is elevated.

Figure 2:
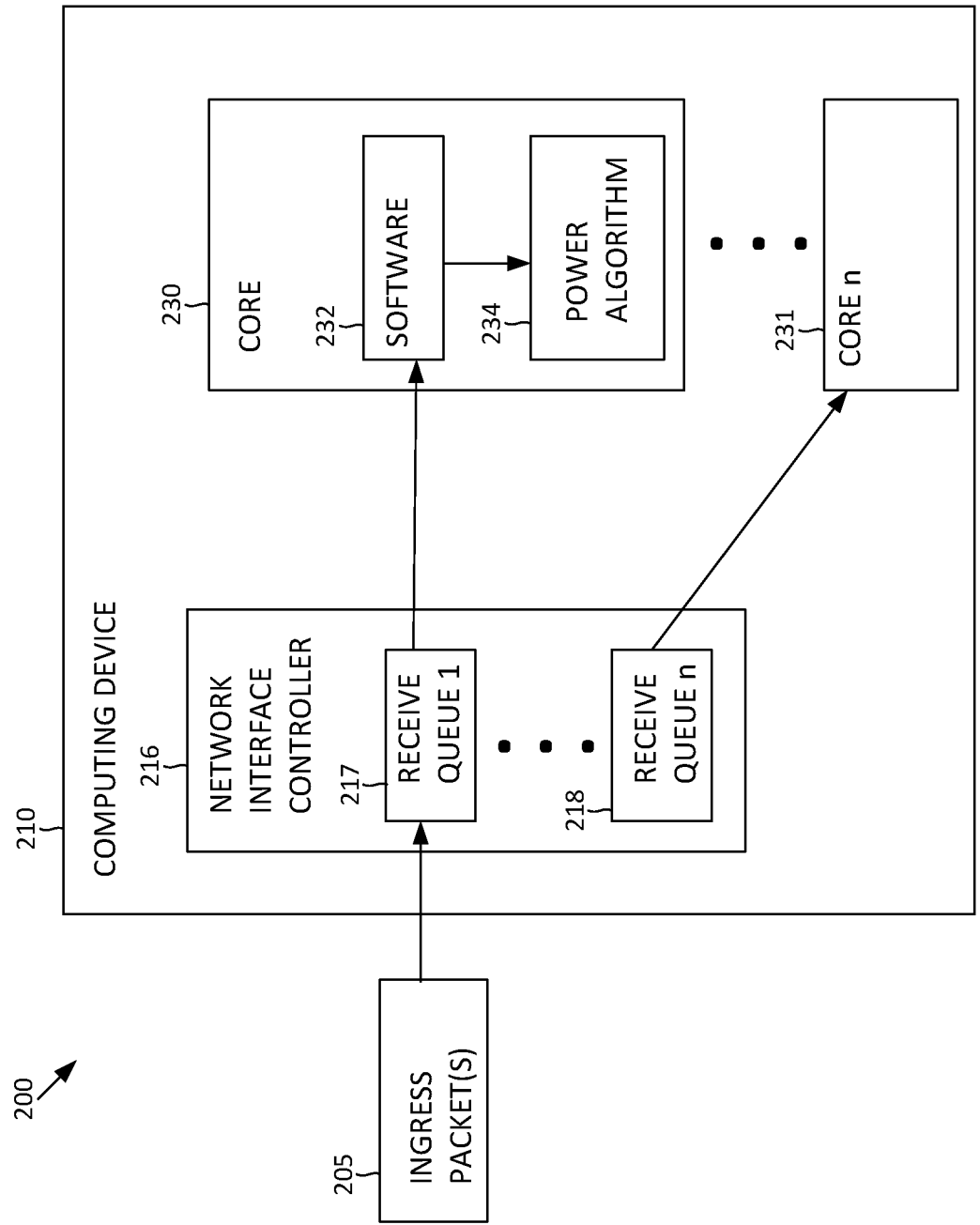
FIG. 2 is a functional block diagram illustrating a first example of a system having a computing device that includes a network interface controller (NIC) and at least one central processing unit (CPU) core in accordance with certain embodiments of the disclosed technology.

FIG. 2 is a functional block diagram illustrating a first example of a system 200 having a computing device 210 that includes a network interface controller (NIC) 216, such as an Ethernet controller, and at least one central processing unit (CPU) core 230 in accordance with certain embodiments of the disclosed technology. It should be noted that, as used herein, the terms NIC and host fabric interface (HFI) are interchangeable. The NIC 216 has n receive queues, such as registers or other suitable data storage components, for receiving data from other computing devices. In the example, a first receive queue 217 of the NIC 216 receives one or more ingress data packets 205, e.g., from a separate computing device over a wired or wireless connection.

Each of the n receive queues of the NIC 216 is mapped to one or more cores. This mapping may be re-configurable, e.g., depending on the hardware specifications and/or other details of the particular implementation. In the example, the first receive queue 217 is mapped to at least a first CPU core 230 and the nth receive queue 218 is mapped to the nth Core 231. The CPU core 230 includes software 232, e.g., for performing processing on the data packet(s) received from the first receive queue 217, and a power algorithm 234, which may be implemented as software, firmware, or hardware. In certain embodiments, a notification such as an interrupt is sent to the software 232 upon receipt of the incoming data packet 205 by the first receive queue 217. In alternative embodiments, a poll mode driver may be used in place of an interrupt setup.

As used herein, the term queue depth generally refers to a quantified measure of how many computing tasks for a certain receive queue are awaiting processing by the MC 216 at a particular moment, e.g., the number of outstanding receive packets, such as data packets, that have not yet been processed by a corresponding CPU core such as the first CPU core 230. In certain implementations, the NIC 216 may scale the size of a certain receive queue as needed, e.g., if packets would be otherwise dropped. In such embodiments, the queue depth may be the size of the receive queue data structure.

In the example, the software 232 of the CPU core 230 may determine a queue depth of the first receive queue 217 based on information within a designated field of the receive descriptor, which is generated by the NIC 216. In certain implementations, the software 232 reads the appropriate field in the receive descriptor to obtain the queue depth. In alternative implementations, information pertaining to the queue depth may be provided to or otherwise maintained in a separate location that the software 232 can read, such as a designated register or memory location, for example.

The software 232 may then forward the queue depth for the first receive queue 217 to the power algorithm 234. Based on the queue depth as well as the current needs of the CPU core 230, the power algorithm 234 can determine whether the power state of the CPU core 230 should be adjusted. For example, if the power algorithm 234 determines that the power state of the CPU core 230 may be reduced without negatively impacting the performance of the CPU core 230, e.g., the queue depth is below a certain threshold, the power algorithm 234 may cause the power state to be reduced accordingly.

It will be appreciated that, while the power algorithm 234 in the example is on the same CPU core 230 as the software 232 in the example 200, the power algorithm 234 can run on a separate core in other, alternative implementations.

In certain implementations, the power algorithm 234 may have an integrated hysteresis, e.g., throttling, to ensure that CPU core power state changes are not made too frequently or unnecessarily, for example. Such throttling may include one or more queue depth thresholds. For example, the power algorithm 234 may cause a reduction in the power state of a particular CPU core whenever the associated queue depth is below a certain threshold and, alternatively or in addition thereto, the power algorithm 234 may cause an increase in the power state of the CPU core whenever the associated queue depth is above a certain threshold, e.g., the same threshold or a separate threshold. The increasing and/or decreasing of CPU core power states may thus be advantageously dynamic.

Figure 3:
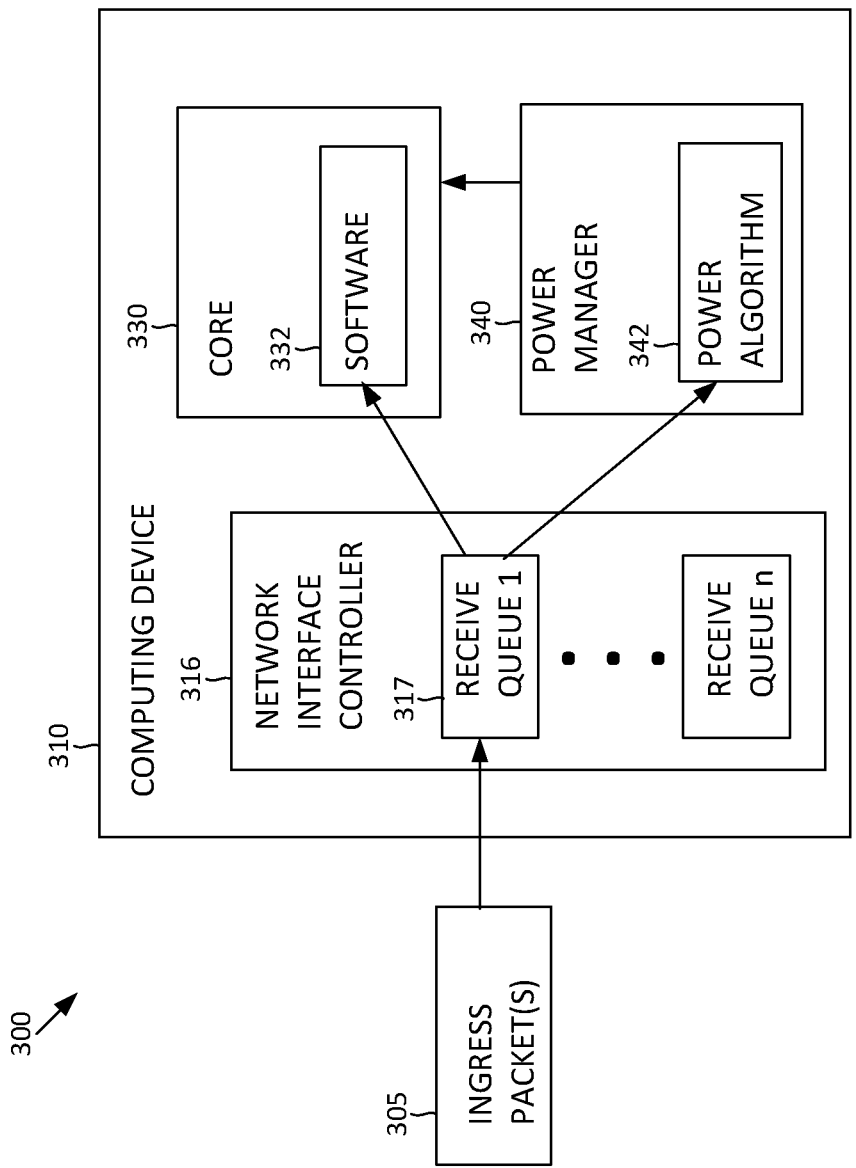
FIG. 3 is a functional block diagram illustrating a second example of a system having a computing device that includes a NIC and at least one CPU core in accordance with certain embodiments of the disclosed technology.

FIG. 3 is a functional block diagram illustrating a second example of a system 300 having a computing device 310 that includes a NIC 316, such as an Ethernet controller, and at least one CPU core 330 in accordance with certain embodiments of the disclosed technology. The NIC 316 is similar to the NIC 216 of FIG. 2 in that it also has n receive queues, such as registers or other suitable data storage components, for receiving data from other computing devices. In the example, a first receive queue 317 of the NIC 316 receives one or more ingress data packets 305, e.g., from a separate computing device over a wired or wireless connection.

Similar to the system 200 illustrated by FIG. 2, each of the n receive queues of the NIC 316 is mapped to one or more cores, and such mappings may be re-configurable, e.g., depending on the hardware specifications and/or other details of the particular implementation. In the example, the first receive queue 317 is mapped to at least a first CPU core 330. The CPU core 330 includes software 332, e.g., for performing processing on the information received from the first receive queue 317. In certain embodiments, a notification such as an interrupt may be sent to the software 332 upon receipt of the incoming data packet(s) 305 by the first receive queue 317. Alternatively, a poll mode driver may be used in place of an interrupt.

In the example, the computing device 310 includes a power manager 340 running a power algorithm 342. The power manager 340 may be on a CPU core other than the first CPU 317 or it may be on an entirely separate die. It will be appreciated that the power manager 340 may be locationally positioned virtually anywhere, so long as it is communicatively coupled with the receive queues of the NIC 316 and the CPU core 330. In certain implementations, the power manager 340 may be implemented as or in connection with a manageability engine or an innovation engine.

In the example, the power algorithm 342 of the power manager 340 may determine a queue depth of the first receive queue 317 based on information within a designated field of the receive descriptor. Alternatively, information pertaining to the queue depth may be provided to or otherwise maintained in a separate location that the power manager 340 can read, such as a designated register or memory location, for example.

Based on the queue depth as well as the current needs of the CPU core 330, the power algorithm 342 can determine whether the power state of the CPU core 330 should be adjusted. For example, if the power algorithm 342 determines that the power state of the CPU core 330 may be reduced without negatively impacting the performance of the CPU core 330, e.g., the queue depth is below a certain threshold, the power manager 340 may cause the power state of the CPU core 330 to be reduced accordingly.

The power manager 340 may have an integrated hysteresis, e.g., throttling capability, to ensure that CPU core power state changes are not made too frequently or unnecessarily, for example. Such throttling may include one or more queue depth thresholds. For example, the power manager 340 may cause a reduction in the power state of a particular CPU core whenever the power algorithm 342 determines that the associated queue depth is below a certain threshold and, alternatively or in addition thereto, the power manager 340 may cause an increase in the power state of the CPU core whenever the power algorithm 342 determines that the associated queue depth is above a certain threshold, e.g., the same threshold or a separate threshold.

In certain implementations, the power manager 340 may include an integrated hysteresis, e.g., dynamic throttling, to ensure that CPU core power state changes are not made too frequently or unnecessarily, for example. Such throttling may include one or more queue depth thresholds. For example, the power manager 340 may cause a reduction in the power state of a particular CPU core whenever the power algorithm 342 determines that an associated queue depth is below a certain threshold and, alternatively or in addition thereto, the power manager 340 may cause an increase in the power state of the CPU core whenever the power algorithm 342 determines that the associated queue depth is above a certain threshold, e.g., the same threshold or a separate threshold.

Figure 4:
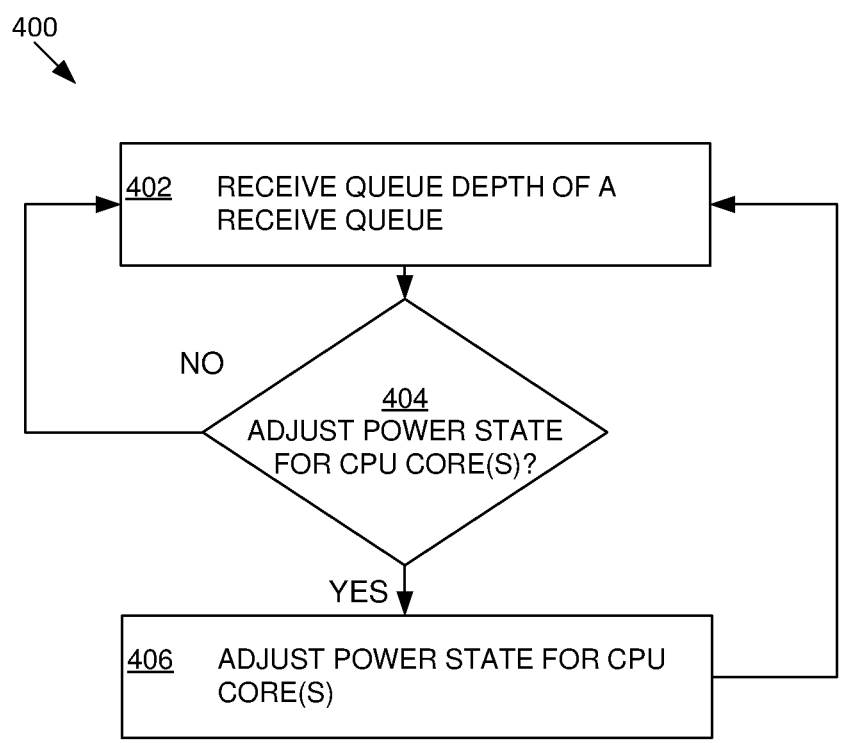
FIG. 4 is a flow diagram illustrating an example of a computer-implemented method in accordance with certain embodiments of the disclosed technology.

FIG. 4 is a flow diagram illustrating an example of a computer-implemented method 400 in accordance with certain embodiments of the disclosed technology.

At block 402, the queue depth for a receive queue, e.g., a receive queue of a NIC, is received by a power algorithm, such as the power algorithm 234 of FIG. 2 or the power algorithm 342 of FIG. 3. In certain embodiments, the queue depth may be sent to the power algorithm by software on the CPU core, such as the software 232 on the CPU core 230 of FIG. 2.

The queue depth for the receive queue may include a quantified measure of how many computing tasks for the receive queue are lined up at that particular moment, e.g., the number of outstanding receive packets, e.g., data packets, that have not yet been processed by a corresponding CPU core.

At block 404, a determination is made as to whether the power state of one or more CPU cores, e.g., CPU cores associated with the receive queue, should be adjusted. Such determination may be made by the power algorithm based on the queue depth. The determination may include the use of one or more queue depth thresholds. In certain embodiments, the determination may take into account other information such as the current needs of the CPU core(s) and/or past adjustments to the CPU core power state.

Responsive to a determination that the CPU core power state should be adjusted, e.g., increased or decreased, such adjustment is made, as indicated at block 406, and processing returns to block 402; otherwise, processing simply proceeds directly to block 402. It will be appreciated that subsequent performance of the process 400 beginning at block 402 may be done continuously, on a periodic basis, or responsive to a certain event such as a user request, for example.

Figure 5:
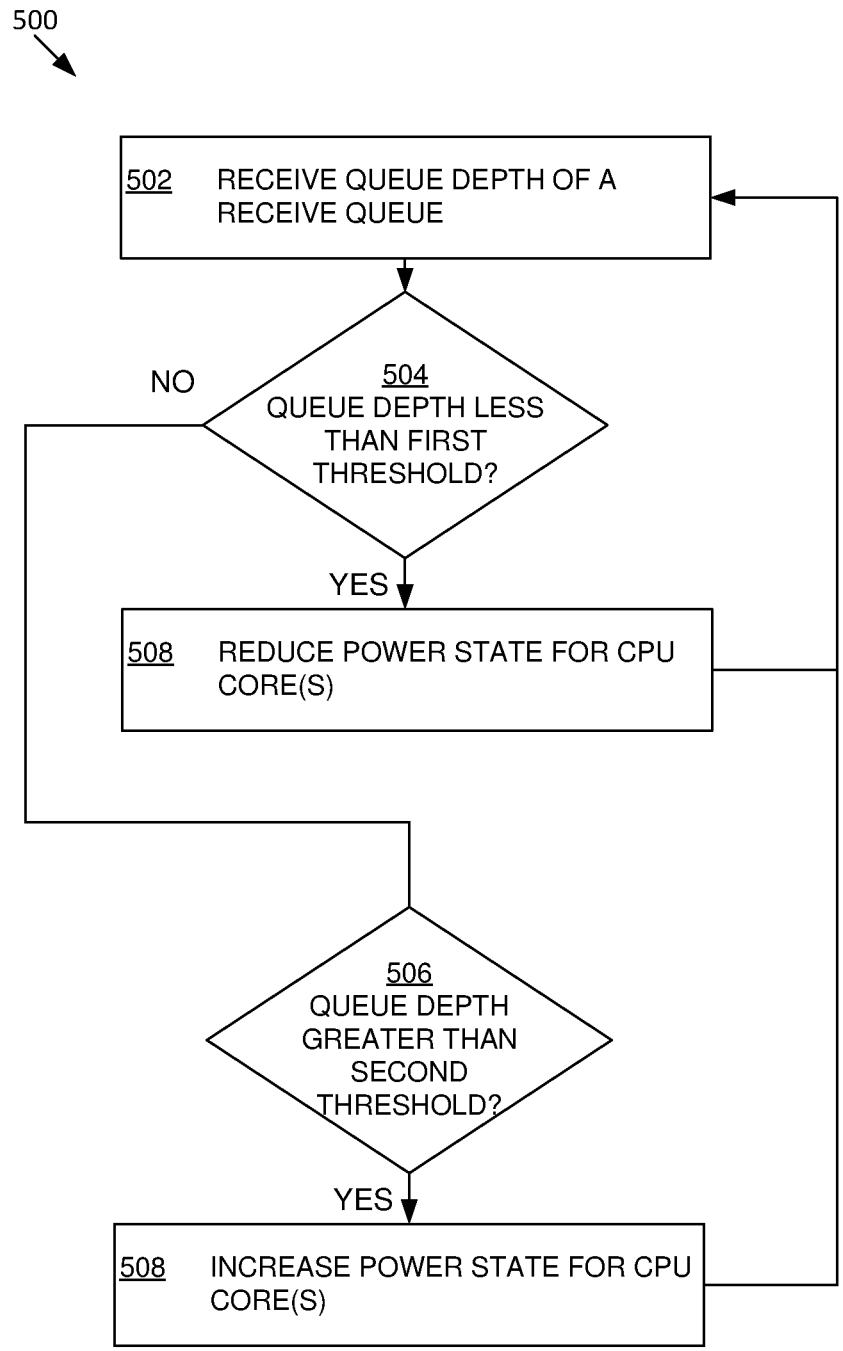
FIG. 5 is a flow diagram illustrating another example of a computer-implemented method in accordance with certain embodiments of the disclosed technology.

FIG. 5 is a flow diagram illustrating another example of a computer-implemented method 500 in accordance with certain embodiments of the disclosed technology.

At block 502, which is similar to block 402 of the method 400 illustrated by FIG. 4, a queue depth for a particular receive queue is received, e.g., by a power algorithm. The queue depth may include a quantified measure of how many computing tasks for the receive queue are lined up at that particular moment, e.g., the number of outstanding receive data packets that have not yet been processed by a corresponding CPU core.

At block 504, a determination is made as to whether the queue depth is less than a first queue depth threshold. If it is determined, e.g., by a power algorithm, that the queue depth is indeed less than the first threshold, the method 500 proceeds to block 508; otherwise, the method 500 proceeds to block 506.

At block 508, the power state of at least one CPU core, e.g., each CPU core associated with the receive queue, is reduced. Such reducing may be dependent upon what the CPU core can support, for example.

At block 506, a determination is made as to whether the queue depth exceeds a second queue depth threshold. If it is determined, e.g., by the power algorithm, that the queue depth does exceed the second threshold, the method 500 proceeds to block 510; otherwise, the method 500 returns to block 502.

At block 510, the power state of at least one CPU core, e.g., each CPU core associated with the receive queue, is increased, e.g., dependent upon what the CPU core can support. Certain implementations can include a feedback loop to ramp CPU core power and/or frequency to prevent trashing of the power levels, for example.

Subsequent performance(s) of the method 500 beginning at block 502 may be done continuously, on a periodic basis, or responsive to a certain event such as a user request, for example.

EXAMPLES

Illustrative examples of the technologies disclosed herein are provided below. An embodiment of the technologies may include any one or more, and any combination of, the examples described below.

Example 1 includes a computer-implemented method comprising: receiving a queue depth for a receive queue of a network interface controller (NIC); determining whether a power state of a central processing unit (CPU) core mapped to the receive queue should be adjusted based on the queue depth; and responsive to a determination that the power state of the CPU core should be adjusted, adjusting the power state of the CPU core.

Example 2 includes the subject matter of Example 1, and wherein adjusting the power state of the CPU core includes reducing the power state of the CPU core.

Example 3 includes the subject matter of any of Examples 1-2, and wherein adjusting the power state of the CPU core includes increasing the power state of the CPU core.

Example 4 includes the subject matter of any of Examples 1-3, and wherein determining whether the power state of the CPU core should be adjusted includes comparing the queue depth of the receive queue to a threshold.

Example 5 includes the subject matter of Example 4, and wherein adjusting the power state of the CPU core includes reducing the power state of the CPU core responsive to the queue depth of the receive queue being less than the threshold.

Example 6 includes the subject matter of Example 4, and wherein adjusting the power state of the CPU core includes increasing the power state of the CPU core responsive to the queue depth of the receive queue exceeding the threshold.

Example 7 includes the subject matter of any of Examples 1-6, the method further comprising repeating the receiving and determining continuously.

Example 8 includes the subject matter of Example 7, the method further comprising repeating the receiving and determining at a specified time interval.

Example 9 includes the subject matter of any of Examples 1-8, and wherein the NIC is an Ethernet controller.

Example 10 includes a system comprising: a network interface controller (NIC) of a first computing device, the NIC having a receive queue; a first central processing unit (CPU) core of the first computing device, the first CPU core being mapped to the receive queue; and a power algorithm for determining, based on a queue depth of the receive queue, whether a power state of the first CPU core should be adjusted.

Example 11 includes the subject matter of Example 10, and wherein the power algorithm causes the power state of the first CPU core to be reduced.

Example 12 includes the subject matter of any of Examples 10-11, and wherein the power algorithm causes the power state of the first CPU core to be increased.

Example 13 includes the subject matter of any of Examples 10-12, and wherein the power algorithm compares the queue depth of the receive queue to a threshold.

Example 14 includes the subject matter of Example 13, and wherein the power algorithm causes the power state of the first CPU core to be reduced responsive to a determination that the queue depth of the receive queue is less than the threshold.

Example 15 includes the subject matter of Example 13, and wherein the power algorithm causes the power state of the first CPU core to be increased responsive to a determination that the queue depth of the receive queue exceeds the threshold.

Example 16 includes the subject matter of any of Examples 10-15, and wherein the power algorithm is on the first CPU core.

Example 17 includes the subject matter of any of Examples 10-16, and wherein the power algorithm is on a second CPU core.

Example 18 includes the subject matter of Example 17, and wherein the first and second CPU cores are on different dies.

Example 19 includes the subject matter of any of Examples 10-18, the system further comprising a power manager that includes the power algorithm.

Example 20 includes the subject matter of Example 19, and wherein the power manager and the first CPU core are on different dies.

Example 21 includes the subject matter of any of Examples 10-20, the system further comprising a second computing device for sending an incoming data packet to the first computing device.

Example 22 includes the subject matter of any of Example 21, and wherein the receive queue receives the incoming data packet.

Example 23 includes the subject matter of any of Example 22, and wherein the receive queue has a receive descriptor.

Example 24 includes the subject matter of any of Example 23, and wherein the receive descriptor includes the queue depth of the receive queue.

Example 25 includes one or more non-transitory computer-readable media comprising instructions that, when executed by a processor, cause the processor to perform a method comprising: receiving a queue depth for a receive queue of a network interface controller (NIC); determining whether a power state of a central processing unit (CPU) core mapped to the receive queue should be adjusted based on the queue depth; and responsive to a determination that the power state of the CPU core should be adjusted, adjusting the power state of the CPU core.

Example 26 includes the subject matter of Example 1, and wherein adjusting the power state of the CPU core includes reducing the power state of the CPU core.

Example 27 includes the subject matter of any of Examples 25-26, and wherein adjusting the power state of the CPU core includes increasing the power state of the CPU core.

Example 28 includes the subject matter of any of Examples 25-27, and wherein determining whether the power state of the CPU core should be adjusted includes comparing the queue depth of the receive queue to a threshold.

Example 29 includes the subject matter of Example 28, and wherein adjusting the power state of the CPU core includes reducing the power state of the CPU core responsive to the queue depth of the receive queue being less than the threshold.

Example 30 includes the subject matter of Example 28, and wherein adjusting the power state of the CPU core includes increasing the power state of the CPU core responsive to the queue depth of the receive queue exceeding the threshold.

Example 31 includes the subject matter of any of Examples 25-30, the method further comprising repeating the receiving and determining continuously.

Example 32 includes the subject matter of Example 31, the method further comprising repeating the receiving and determining at a specified time interval.

Example 33 includes the subject matter of any of Examples 25-32, and wherein the NIC is an Ethernet controller.

The previously described versions of the disclosed subject matter have many advantages that were either described or would be apparent to a person of ordinary skill. Even so, all of these advantages or features are not required in all versions of the disclosed apparatus, systems, or methods.

Additionally, this written description makes reference to particular features. It is to be understood that the disclosure in this specification includes all possible combinations of those particular features. For example, where a particular feature is disclosed in the context of a particular aspect or embodiment, that feature can also be used, to the extent possible, in the context of other aspects and embodiments.

Also, when reference is made in this application to a method having two or more defined steps or operations, the defined steps or operations can be carried out in any order or simultaneously, unless the context excludes those possibilities.

Embodiments of the disclosed technology may be incorporated in various types of architectures. For example, certain embodiments may be implemented as any of or a combination of the following: one or more microchips or integrated circuits interconnected using a motherboard, a graphics and/or video processor, a multicore processor, hardwired logic, software stored by a memory device and executed by a microprocessor, firmware, an application specific integrated circuit (ASIC), and/or a field programmable gate array (FPGA). The term "logic" as used herein may include, by way of example, software, hardware, or any combination thereof.

Although specific embodiments have been illustrated and described herein, it will be appreciated by those of ordinary skill in the art that a wide variety of alternate and/or equivalent implementations may be substituted for the specific embodiments shown and described without departing from the scope of the embodiments of the disclosed technology. This application is intended to cover any adaptations or variations of the embodiments illustrated and described herein. Therefore, it is manifestly intended that embodiments of the disclosed technology be limited only by the following claims and equivalents thereof.

We claim:

1. An apparatus, comprising:
a central processing unit (CPU) core to be mapped to a queue of a network interface controller, wherein the CPU core comprises:
a memory to store instructions; and
a processor to execute the instructions to:
receive a descriptor from the network interface controller, wherein a designated field of the descriptor indicates a queue depth of the queue, and the queue depth is a number of outstanding received data packets that have not yet been processed by the CPU core;
read the designated field of the descriptor to determine the queue depth of the queue; and
send the queue depth to a power algorithm, wherein the power algorithm is to adjust a power state of the CPU core based on a comparison of the queue depth to first and second thresholds, execute at a power manager which is coupled to the CPU core, and provide a hysteresis to limit a frequency with which changes are made to the power state, wherein to provide the hysteresis, the power algorithm is to reduce the power state when the queue depth is below the first threshold and to increase the power state when the queue depth is above the second threshold, separate from the first threshold.

2. The apparatus of claim 1, further comprising a second CPU core to be mapped to a second queue, wherein the second CPU core is to:
receive a descriptor of the second queue from the network interface controller, wherein a designated field of the descriptor of the second queue indicates a queue depth of the second queue;
read the designated field of the descriptor of the second queue to determine the queue depth of the second queue; and
send the queue depth to the power algorithm, wherein the power algorithm is to adjust a power state of the second CPU core based on a comparison of the queue depth of the second queue to one or more thresholds.

3. The apparatus of claim 1, wherein the power algorithm is to determine whether to adjust the power state of the CPU core based on the queue depth and current needs of the CPU core.

4. The apparatus of claim 1, wherein the power algorithm is to determine whether to adjust the power state of the CPU core based on past adjustments to the power state.

5. The apparatus of claim 1, wherein to adjust the power state, the power algorithm is to implement a feedback loop to ramp a power of the CPU core.

6. The apparatus of claim 1, wherein to adjust the power state, the power algorithm is to implement a feedback loop to ramp a frequency of the CPU core.

7. The apparatus of claim 1, wherein the queue depth is a measure of how many computing tasks are awaiting processing by the CPU core.

8. The apparatus of claim 1, wherein the power manager is on a CPU core other than the CPU core to be mapped to the queue.

9. The apparatus of claim 1, wherein the power manager is to execute on a separate die than a die of the CPU core.

10. The apparatus of claim 1, wherein the power algorithm is to increase the power state of the CPU core as the CPU core processes data packets from the queue when the queue depth is above the second threshold.

11. The apparatus of claim 1, wherein the power manager and the CPU core are part of the processor.

12. The apparatus of claim 1, further comprising a second CPU core to be mapped to a second queue, wherein the second CPU core is to:
receive a descriptor of the second queue from the network interface controller, wherein a designated field of the descriptor of the second queue indicates a queue depth of the second queue;
read the designated field of the descriptor of the second queue to determine the queue depth of the second queue; and
send the queue depth to the power algorithm, wherein the power algorithm is to adjust a power state of the second CPU core based on a comparison of the queue depth of the second queue to the first and second thresholds.

13. The apparatus of claim 1, wherein the CPU core is among a plurality of CPU cores which are mapped to the queue, and the power algorithm is to adjust a power state of each CPU core of the plurality of CPU cores based on the comparison of the queue depth to the first and second thresholds.

14. The apparatus of claim 1, wherein the CPU core is among a plurality of CPU cores which are mapped to a plurality of queues, and the power control algorithm is to receive an indication of a respective queue depth from each CPU core, and to adjust a power state of each CPU core of the plurality of CPU cores based on a comparison of the respective queue depth to the first and second thresholds.

15. An apparatus, comprising:
a queue in a network interface controller;
a first central processing unit (CPU) core to be mapped to the queue;
a second CPU core to be mapped to the queue; and
a power manager coupled to the first CPU core and the second CPU core, wherein the power manager is to:
receive information indicating a queue depth of the queue;
determine whether to change a power state of the first CPU core based on a comparison of the queue depth to first and second thresholds and provide a hysteresis to limit a frequency with which changes are made to the power state of the first CPU core, wherein to provide the hysteresis, the power manager is to reduce the power state of the first CPU core when the queue depth is below the first threshold and to increase the power state of the first CPU core when the queue depth is above the second threshold, separate from the first threshold; and determine whether to change a power state of the second CPU core based on a comparison of the queue depth to the first and second thresholds.

16. The apparatus of claim 15, wherein the power manager is to receive the queue depth from the network interface controller.

17. The apparatus of claim 15, wherein the power manager is to scale a size of the queue to avoid dropping packets, and the queue depth is the size of the queue.

18. The apparatus of claim 15, wherein the power manager is in a CPU core which is different than the first CPU core and the second CPU core.

19. One or more non-transitory computer-readable media comprising instructions that, when executed by a processor, cause the processor to perform a method at a power manager, the method comprising:
   obtaining information indicating a first queue depth of a first queue of a network interface controller and a second queue depth of a second queue of a network interface controller;
   adjusting a power state of a first CPU core to be mapped to the first queue based on a comparison of the first queue depth to first and second thresholds;
   adjusting a power state of a second CPU core to be mapped to the second queue, based on a comparison of the second queue depth to the first and second thresholds, wherein the power manager is on a CPU core which is separate from the first CPU core and the second CPU core and the power manager is coupled to the first CPU core and the second CPU core; and
   providing a hysteresis to limit a frequency with which changes are made to the power state of the first CPU core, wherein the providing of the hysteresis comprises reducing the power state of the first CPU core when the first queue depth is below the first threshold and increasing the power state of the first CPU core when the first queue depth is above the second threshold, separate from the first threshold.

20. The one or more non-transitory computer-readable media of claim 19, wherein the method performed further comprises obtaining the information indicating the first queue depth and the second queue depth from a designated field in a descriptor received from the network interface controller.

21. The one or more non-transitory computer-readable media of claim 19, wherein the method performed further comprises obtaining the information from a designated memory location.

22. The one or more non-transitory computer-readable media of claim 19, wherein the obtaining of the information indicating the first and second queue depths comprises receiving descriptors from the network interface controller and reading a specified field in the descriptors.

* * * * *

UNITED STATES PATENT AND TRADEMARK OFFICE
CERTIFICATE OF CORRECTION

Page 1 of 1

PATENT NO. : 11,797,076 B2
APPLICATION NO. : 17/364523
DATED : October 24, 2023
INVENTOR(S) : Brian J. Skerry et al.

It is certified that error appears in the above-identified patent and that said Letters Patent is hereby corrected as shown below:

In the Claims

Column 9
Line 29, "w herein..." should read --wherein...--
Line 35, "...w herein..." should read --...wherein...--

Signed and Sealed this
Eighth Day of April, 2025

Coke Morgan Stewart
*Acting Director of the United States Patent and Trademark Office*